United States Patent [19]

Prochaska et al.

[11] Patent Number: 4,750,935

[45] Date of Patent: Jun. 14, 1988

[54] PRINTING INK

[75] Inventors: Helmut P. Prochaska, Wayne; Walter Tames, Hillside, both of N.J.; Klaus Kunde, Leverkusen, Fed. Rep. of Germany; Artur Haus, Overath, Fed. Rep. of Germany; Knud Reuter, Krefeld-Bockum, Fed. Rep. of Germany

[73] Assignees: Mobay Corporation, Pittsburgh, Pa.; Bayer Aktiengesellschaft, Leverkusen, Fed. Rep. of Germany

[21] Appl. No.: 942,478

[22] Filed: Dec. 16, 1986

[51] Int. Cl.$^4$ ............................................... C09D 11/00
[52] U.S. Cl. ........................................ 106/20; 106/22
[58] Field of Search ............................... 106/20, 22

[56] References Cited

U.S. PATENT DOCUMENTS

| 3,137,671 | 6/1964 | Heinrich et al. | 525/440 |
| 3,228,780 | 6/1966 | Grelat | 106/288 Q |
| 3,993,493 | 11/1976 | McLaren et al. | 106/20 |
| 3,994,835 | 11/1976 | Wall et al. | 521/107 |
| 4,065,316 | 12/1977 | Baron et al. | 106/22 |
| 4,076,494 | 2/1978 | Schuster et al. | 106/22 |
| 4,234,481 | 11/1980 | Steiner | 106/20 |
| 4,365,998 | 12/1982 | Sugiyama et al. | 106/22 |
| 4,666,519 | 5/1987 | Akiyama et al. | 106/20 |

Primary Examiner—Paul Lieberman
Assistant Examiner—Willie J. Thompson
Attorney, Agent, or Firm—Gene Harsh; Joseph C. Gil; Aron Preis

[57] ABSTRACT

Printing inks are described which utilize a unique class of coloring agents which are the reaction products of free NCO group bearing resins and dyestuffs bearing reactive hydrogens. A novel class of such adducts which contain monocarboxylic acid residues are also described. These printing inks, which may also contain traditional pigments, find particular utility in letterpress or offset printing.

16 Claims, No Drawings

PRINTING INK

FIELD OF THE INVENTION

The present invention relates to printing ink based on a specific class of colouring agents and certain colouring agents which are particularly suitable in such a printing ink.

BACKGROUND OF THE INVENTION

Conventional printing inks, in particular letterpress and offset printing inks, are, in addition to other constituents, for example mineral oils, siccatives and anti-skinning agents etc., essentially composed of a varnish and pigments, there being used for four-colour printing, in addition to black, for which, for example, carbon black is used, organic pigments in the colours yellow, magenta and cyan. The varnish contains, for example, alkyd resins, hard resins and solvents or diluents.

The printing ink systems which are produced with the use of organic pigments, which is almost exclusively practiced nowadays, result in printing which is adequate in many respects on sheet-fed and rotary letterpress and offset printing, nevertheless there is a permanent requirement for further improvements, for example in colour strength, lack of hiding power (transparency) and brilliance as well as in the problems that derive from dispersions of particulate pigment bodies within the ink vehicle.

For example, with organic pigments these said properties cannot be improved beyond certain limits which are determined by, inter alia, the particle size of the dispersed pigments.

Dyestuff molecules have been immobilized in polyurethane matrices by chemical combination with the isocyanate reactant used to form the polyurethane. Typically the dyestuff was reacted with the isocyanate at the same time as the co-reactant used to form the polyurethane, typically a polyether or polyester polyol. U.S. Pat. No. 3,137,671 describes combining all the polyurethane forming reactants and the dyestuff simultaneously to obtain a fully cured polyurethane. It also describes premixing the dyestuff with some of the reactants before the final polyurethane forming reaction takes place. If the dyestuff is premixed with the isocyanate reactant a lower molecular weight adduct may be transiently formed. The finally cured high molecular weight polyurethane may be in the form of a foam or lacquer film or it may be ground and used as a pigment for colouring polyvinyl chloride molding resin. U.S. Pat. No. 3,228,780 describes simply adding a pigment with potentially isocyanate reactive amino groups to polyurethane forming reactants and obtaining a coloured foam. U.S. Pat. No. 3,994,835 discloses coloured polyurethane foams with chemically incorporated dyestuffs prepared by incorporating a dispersion of a dye with free amino or hydroxyl groups into the polyurethane foam forming reaction mixture.

In the present invention, printing inks, in particular letterpress and offset printing inks, are presented, which, compared with the conventional pigment-based printing inks, make possible considerable advantages in the lack of hiding power, the brilliance, the gloss of the printings or the depth of colour, and, where appropriate, offer advantages in several, or even all, of the said points.

SUMMARY OF THE INVENTION

The printing inks of the present invention are based upon a specific class of colouring agents obtained by reacting dyestuff molecules bearing reactive hydrogens with free NCO group bearing resins. The particularly suitable colouring agents of the present invention are obtained by utilizing free NCO group bearing resins which contain the residues of monocarboxylic acids and the residues of polyols. The printing inks of the present invention may also contain an independent varnish and common printing ink additives such as siccatives, anti-skinning agents and flow control agents.

These printing inks preferably contain a colouring agent obtained by reacting a dyestuff of the formula $$F(Y'H)_n \qquad \qquad I$$

in which
F designates a dyestuff radical,
Y' designates —O—, —S—,

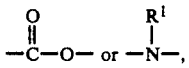

$R^1$ designates hydrogen, alkyl, preferably $C_1$ to $C_4$ alkyl, or cycloalkyl, preferably cyclopentyl or cyclohexyl and
n designates an integer between 1 and 6 inclusive
with a resin which carries at least one isocyanate group and at least eighteen carbon atoms.

The particularly suitable colouring agents are obtained from the reaction of between about 3 and 70 weight percent of the dyestuffs of formula I with between about 97 and 30 weight percent of a free NCO group bearing resin which is itself the reaction product of (i) between about 8 and 35 weight percent of one or more polyalcohols bearing between 2 and 6 hydroxyl groups,
(ii) between about 15 and 80 weight percent of one or more monocarboxylic acids,
(iii) between about 0 and 50 weight percent of one or more dicarboxylic acids,
(iv) between about 0 and 50 weight percent of aliphatic, cycloaliphatic or aromatic diisocyanates whose isocyanate groups are fully reacted in the formation of said resin, and
(v) between about 9 and 75 weight percent of aliphatic, cycloaliphatic or aromatic diisocyanates who, on average, retain one unreacted isocyanate group after formation of said resin.

DETAILED DESCRIPTION OF THE INVENTION

The printing inks of the present invention preferably contain colouring agents of the formula

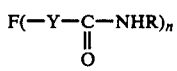

in which
F designates a dyestuff radical,
Y designates a direct bond or the radical of a group —Y—H which can be added onto an NCO group,
R designates an organic radical, and n designates 1, 2, 3, 4, 5 or 6, it being possible when $n \geq 2$ for the radicals

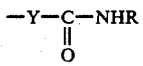    5 to be identical or different, with the proviso that the total number of C atoms in the n R radicals is $\geq 18$,    10 and the particular suitable colouring agents of the formula

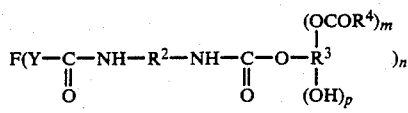    III in which
$R^2$ and $R^4$ designate organic radicals,    20
$R^3$ designates an aliphatic radical,
m designates 1, 2, 3, 4 or 5, and
p designates 0, 1, 2, 3 or 4.
Also preferred are the particularly suitable colouring agents which have a structural element of the formula    25

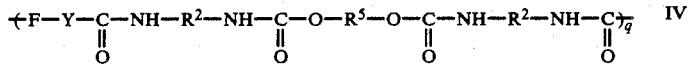    IV in which
$R^5$ designates

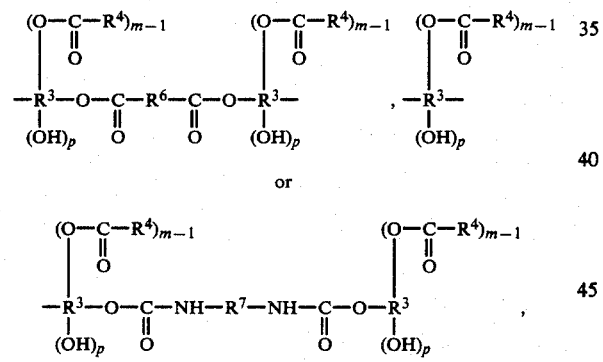

$R^6$ and $R^7$ designate organic radicals, and $q_2$ designates 2, 3, 4, 5, 6, 7, 8, 9 or 10. $R^2$ and $R^7$ preferably    50 represent alkylene, cycloalkylene or arylene radicals, for example represent

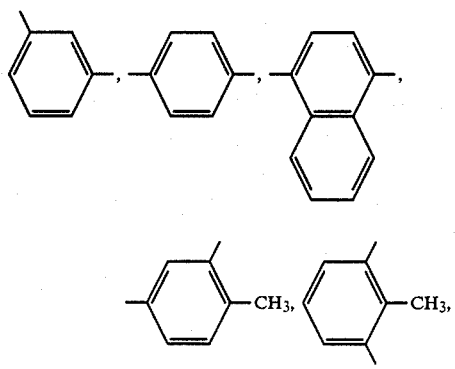

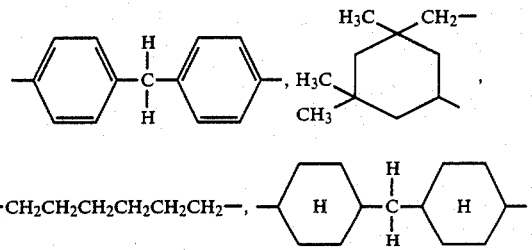

$R^3$ preferably represents an alkyl radical, particularly preferably a $C_1$-$C_8$-alkyl radical which can be interrupted by 0 atoms and substituted by, for example, $C_1$-$C_6$-alkoxy; in the case where $R^3$ is derived from a sugar alcohol, $R^3$ can also have a cyclic ether group.

$R^4$ preferably designates an aliphatic or an aromatic hydrocarbon radical which can have 4–23 C atoms and can be substituted by, for example, —OH, =O, or halogen (chlorine). The aliphatic radical can be acyclic or cyclic, saturated or unsaturated; the unsaturated radical preferably contains 1–3 double bonds. An aromatic radical is preferably a phenyl radical.

$R^6$ preferably designates an aliphatic or an aromatic hydrocarbon radical which can have 1–16 C atoms and can be substituted by, for example, —OH, =O, or halogen (chlorine). The aliphatic radical preferably contains 1–3 double bonds. An aromatic radical is preferably a phenylene radical.

The dyestuffs $F(Y'H)_n$ from which F is derived can belong to a very wide variety of dyestuff classes, for example to the triphenylmethane, oxazine, dioxazine, thiazine, nitro, anthraquinone, coumarin, quinophthalone, benzodifuranone, perylene and naphthalimide, but especially the azo, most especially the monoazo, phthalocyanine or methine, series.

In a typical embodiment, suitable colouring agents are prepared by reaction of
1. 3–70% by weight, preferably 3–55% by weight, particularly preferably 20 to 40% by weight, of an organic dyestuff of the formula $F(Y'H)_n$ with
2. 97–30% by weight, preferably 97–45% by weight, particularly preferably 80–60% by weight, of a NCO-functional compound.

The NCO-functional resin (2) should preferably be prepared from the following components:
(A) 8–35% by weight, particularly preferably 10–25% by weight, of one or more polyalcohols having 2–6 hydroxyl groups,
(B) 15–80% by weight, particularly preferably 24–70% by weight, of a monocarboxylic acid or of a monocarboxylic acid mixture selected from the groups of (a) the essentially unsaturated natural or isomerized natural fatty acid mixtures, (b) the essentially saturated natural fatty acids or (c) the synthetic aliphatic, straight-chain or branched fatty acids, (d) the monocyclic, cycloaliphatic monocarboxylic acid, (e) the polycyclic, optionally unsaturated natural (terpenoid) resin acids, or those obtained from the latter by isomerization, hydrogenation or partial dehydrogenation, and (f) the aromatic, optionally alkyl-substituted $C_6$–$C_{14}$-monocarboxylic acids, (C) 0 to 50% by weight, particularly preferably 0 to 35% by weight, of one (or more) aliphatic, cycloaliphatic or aromatic dicarboxylic acid(s) or their esterifiable derivatives, (D) 0 to 50% by weight, particularly preferably 0 to 35% by weight, of one (or more) aliphatic, cycloaliphatic or aromatic diisocyanate(s), essentially both NCO groups of which are reacted on formation of the NCO-functional resin, and (E) 9 to 75% by weight, particularly preferably 20 to 60% by weight, of one (or more) aliphatic, cycloaliphatic or aromatic diisocyanate(s), very particular preference being given to those diisocyanates having two NCO groups of different reactivity, with the proviso that the total of (A), (B), (C), (D) and (E) is 100%, and the isocyanates of component (E) on average mainly react with only one of their NCO groups, and the second, which is, where appropriate, less reactive, remains essentially unreacted.

The reaction of components (A) to (E) to give the NCO-functional resin (2) is advantageously carried out in such a manner that initially (A) is reacted with (B), (C) and (D) to give a OH-functional precondensate which is then reacted with (E) to give the resin (2). If the intention is to prepare products of natural fatty acids—(B), groups (a) and (b)—then it may be advantageous to use these fatty acids in the form of the naturally occurring oils (triglycerides) and to transesterify the oils with polyalcohols (A) by the known processes to give hydroxy-functional partial ester intermediates which can then be reacted with (C), (D) and (E) and, where appropriate, directly with (E), to give the resin (2).

Examples of suitable polyalcohols (component (A)) which contain the radical $R^3$ are: ethylene glycol, 1,2-propylene glycol, 1,3-propanediol, 1,2-butylene glycol, 2,3-butylene glycol, 1,3-butanediol, 1,4-butanediol, 1,6-hexanediol, diethylene glycol, triethylene glycol, glycerol, trimethylolethane, trimethylolpropane, pentaerythritol, 2,2,2′,2′-tetramethylol di-n-butyl ether, dipentaerythritol, diglycerol, sugar alcohols such as xylitol, mannitol and sorbitol, it being necessary to take account of the fact that on esterification with carboxylic acids the mean effective functionality of these alcohols is diminished by about 2 owing to the formation of cyclic internal ethers.

Examples of monocarboxylic acids $R^4$—COOH (component (B)) from group (a) of drying and semi-drying natural fatty acids or those obtained from the natural fatty acids by isomerization: Linseed oil fatty acid, soya oil fatty acid, cottonseed oil fatty acid, peanut oil fatty acid, (con)juvandol fatty acid, ricinenic acid (obtained from natural castor oil or ricinoleic acid by dehydration), oiticica oil fatty acid, tall-oil fatty acid and safflower oil fatty acid.

An example of monocarboxylic acids (B) $R^4$—COOH from group (b) of essentially saturated natural fatty acids is coconut fatty acid. The fatty acid cuts which are obtained from the natural fatty acid mixtures, for example by fractionation, and which mainly contain $C_{22}$-monocarboxylic acid (behenic acid), $C_{18}$-monocarboxylic acid (stearic acid) or $C_{16}$-monocarboxylic acid (palmitic acid) in addition to acids of higher or lower C number, ought also to be mentioned here by way of example.

Examples of monocarboxylic acids (B) $R^4$—COOH from group (c) of synthetic saturated fatty acids are isooctanoic acid, isononanoic acid and isotridecanoic acid.

Typical monocarboxylic acids (B) $R^4$—COOH from group (d) of cycloaliphatic, optionally olefinically unsaturated, monocarboxylic acids are the $C_6$- and $C_7$-carboxylic acids, cyclopentanecarboxylic acid, cyclohexane carboxylic acid and 1,4,5,6-tetrahydrobenzoic acid.

Examples of monocarboxylic acids (B) $R^4$-COOH from group (e) of optionally substituted aromatic monocarboxylic acids are benzoic acid, 3-methylbenzoic acid, 4-methylbenzoic acid, 4-tert.-butylbenzoic acid, 4-chlorobenzoic acid and anisic acid.

Examples of monocarboxylic acids (B) $R^4$—COOH from group (f) of resin acids or colophony derivatives are abietic acid, dehydroabietic acid, neoabietic acid, pimaric acid, isopimaric acid, laevopimaric acid etc.

Examples of suitable dicarboxylic acids (C) corresponding to HOOC—$R^6$—COOH or their esterifiable derivatives are succinic acid (anhydride), glutaric acid (anhydride), adipic acid, pimelic acid, azelaic acid, suberic acid, sebacic acid, dodecanedioic acid, cyclohexane-1,2-dicarboxylic acid (anhydride), 1,2,3,6-tetrahydrophthalic acid (anhydride), phthalic acid (anhydride) and isophthalic acid. Possible, but less preferred, examples are unsaturated aliphatic acids such as fumaric acid, maleic acid (anhydride) and itaconic acid.

In the case where the printing ink according to the invention contains a colouring agent and, where appropriate, one or more additives, but no varnish, the colouring agent is a dyestuff-modified resin, that is to say the colouring agent is chemically incorporated in the varnish.

However, the printing inks according to the invention preferably contain the colouring agent mixed with a varnish. The varnish contains, for example, alkyd resins, urethane-alkyds, hard resins, linseed oil, stand oils and mineral oils, which can be mixed together or boiled down.

The printing inks according to the invention can be used in known manner for printing.

The letterpress or offset printing inks can be used by the customary processes for sheet-fed, but preferably for rotary letterpress and offset printing. In this context, it is possible to prepare four-colour prints with suitable black pigments (carbon black) and the three hues of trichromatic printing, in which all three hues (magenta, cyan and yellow) are generated by means of the colouring agents of the invention. However, it is equally possible to provide only two hues, preferably yellow and magenta, with the colouring agents of the invention. Finally, it is also possible, for one or more hues, to use printing ink pigments and the color bodies described in this invention in conjunction with each other.

The combined use of colouring agents of the present invention and pigments in printing inks can, for example, be advantageous where the object is to obtain a particularly homogeneous large-area printing, to shade a printing ink, to improve the brilliance of a printing with organic pigments, to reduce the hiding power of a pigment print, to improve the properties of carbon black in respect of brilliance and gloss and transparency in four colour printing, or to improve the rheology and printing characteristics of the conventional sheet-fed or rotary letterpress or offset printing inks.

Since the conventional pigment-based letterpress and offset printing inks are fully compatible with the colouring agents of the present invention, addition thereof is possible in any desired ratio.

Accordingly, the invention also relates to printing inks, in particular letterpress and offset printing inks, containing a colouring agent mixture, where appropriate a varnish and, where appropriate, one or more additives such as siccatives, anti-skinning agents and flow-control agents, characterized in that the colouring agent mixture contains at least one colour body of the present invention in addition to a coloured pigment or carbon black.

In the following text, some dyestuff types of the formula $F(Y'H)_n$ which can preferably be used for the preparation of colouring agents of the present invention are listed by way of example.

A. Pyridone-azo dyestuffs of the formula

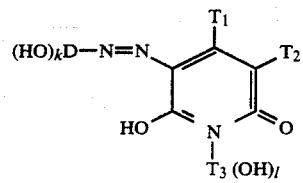

V in which
D designates the radical of a diazo component,
$T_1$ designates alkyl, aryl or —$COOT_4$,
$T_2$ designates H, —CN, —$COOT_4$ or —CONH—$T_5$-$(OH)_1$,
$T_3$ designates aliphatic or araliphatic radicals which can be interrupted by one or more oxygen atoms,
$T_4$ designates hydrogen or alkyl,
$T_5$ designates aliphatic or araliphatic radicals which can be interrupted by one or more oxygen atoms, and
k and l designate 0, 1, 2, 3 or 4, with the proviso that the total of k+l is 1, 2, 3 or 4.

D preferably represents a phenyl radical which can carry 1–4 substituents from the series comprising optionally substituted $C_1$–$C_{12}$-alkyl, $C_2$–$C_{12}$-alkenyl, cyclohexyl, cyclopentyl, cyclohexenyl, halogen such as Cl, Br or F, $C_1$–$C_6$-alkoxy, optionally substituted phenoxy, —CN, —$CF_3$, —$NO_2$, optionally substituted $C_1$–$C_{18}$-alkylsulphonyl, optionally substituted phenylsulphonyl, optionally substituted benzylsulphonyl, optionally substituted phenoxysulphonyl, optionally substituted carbamoyl and optionally substituted sulphamoyl.

The alkyl radicals in $C_1$–$C_{12}$-alkyl and $C_1$–$C_{18}$-alkylsulphonyl can be substituted by, for example, —OH, $C_1$–$C_6$-alkoxy or —CN. The phenyl radicals in phenoxy, phenylsulphonyl, phenoxysulphonyl and benzylsulphonyl can be substituted by, for example, $C_1$–$C_4$-alkyl or halogen such as Cl and Br.

The carbamoyl groups preferably carry two identical or different substituents from the series comprising $C_1$–$C_{18}$-alkyl, which can be substituted by, for example, —OH, $C_2$–$C_{18}$-alkenyl, aryloxyalkyl, $C_9$–$C_{11}$-aralkoxyalkyl, $C_7$–$C_{11}$-aralkyl, $C_4$–$C_{13}$-acyloxyalkyl, $C_6$–$C_{14}$-alkoxycarbonyloxyalkyl, $C_6$–$C_{12}$-alkylaminocarbonyloxyalkyl and $C_4$–$C_9$-dialkylaminoalkyl; appropriate diazo components are disclosed in German Patent Specification A1 No. 3,111,648.

The sulphamoyl groups preferably carry 1 or 2 substituents from the series comprising $C_1$–$C_{18}$-alkyl, or $C_7$–$C_{11}$-aralkyl or $C_1$–$C_{12}$-alkyl which is optionally interrupted by O and optionally substituted by hydroxyl or phenoxy; appropriate diazo components are disclosed in European Patent Specification A1 No. 18,567.

The following may be mentioned as examples of diazo components: aniline, o-, m- and p-toluidine, o- and p-ethylaniline, 2,3-dimethylaniline, 3,4-dimethylaniline, 2,4-dimethylaniline, 2,5-dimethylaniline, o-i-propylaniline, p-i-propylaniline, 2,4,5- and 2,3,5-trimethylaniline, 2-methyl-5-i-propylaniline, 4-tert.-butylaniline, 4-sec.-butylaniline, aniline which is substituted in the o- or p-position by straight-chain or branched $C_{12}$–$C_{25}$-alkyl, 4-cyclohexylaniline, 4-cyclohexyl-2-methylaniline, 4-(1-cyclohexen-1-yl)-aniline, o-, m- and p-chloroaniline, 2,3-, 2,4-, 2,5- and 3,4-dichloroaniline, 5-chloro-2-methylaniline, 4-chloro-2-methylaniline, 3-chloro-2-methylaniline, 2-chloro-5-methylaniline, 4-chloro-3-methylaniline, 3-chloro-4-methylaniline, 2-chloro-3,4-dimethylaniline, 5-chloro-2,4-dimethylaniline, 4-chloro-2,5-dimethylaniline, o-, m- and p-nitroaniline, 2-chloro-4-nitroaniline, 2-nitro-4-chloroaniline, 2-methyl-4-nitroaniline, 4-methyl-2-nitroaniline, 2,4-dimethyl-5-nitroaniline, 2,5-dimethyl-4-nitroaniline, 4-i-propyl-2-nitraniline, 4-tert.-butyl-2-nitroaniline, 4-cyclohexyl-2-nitroaniline, o-, m- and p-methoxyaniline, 2-ethoxy and 4-ethoxyaniline, 2-phenoxyaniline, 2-(2-methylphenoxy)-aniline, 5-chloro-2-methoxyaniline, 5-chloro-2-phenoxyaniline, 5-chloro-2-(4-chlorophenoxy)-aniline, 4,5-dichloro-2-methoxyaniline, 2-methoxy-5-nitroaniline, 2-methoxy-4-nitroaniline, 3-chloro-4-methoxyaniline, 4-methoxy-2-nitroaniline, 4-ethoxy-2-nitroaniline, 4-ethoxy-3-nitroaniline, 3-methoxy-4-methylaniline, 4-methoxy-2-methylaniline, 2-methoxy-5-methylaniline, 2-ethoxy-5-methylaniline, 4-chloro-2-methoxy-5-methylaniline, 4-chloro-2,5-dimethoxyaniline, 2,5-dimethoxy-4-nitroaniline, 2-(phenylsulphonyl)-aniline, 2-(methylsulphonyl)-4-nitroaniline, 2-methoxy-5-(phenylsulphonyl)-aniline, 5-(benzylsulphonyl)-2-methoxyaniline, 5-(ethylsulphonyl)-2-methoxyaniline,

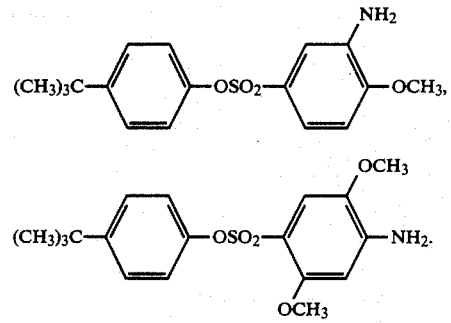

In the case where k in formula (V) is >0, that is to say the diazo component has 1–4 hydroxyl groups, D preferably represents a phenyl radical which can be substituted by hydroxy-$C_1$–$C_{18}$-alkoxy, —$NO_2$, —CN, F, Cl, Br or $C_1$–$C_4$-alkyl, or by a radical of the formulae

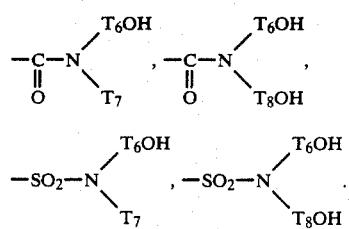

In which $T_6$ and $T_8$ designate aliphatic radicals which can be interrupted by one or more O atoms and $T_7$ designates hydrogen or an aliphatic or araliphatic radical which may be interrupted by one or more O atoms.

It is equally possible to use dyestuffs which, together with the diazo components indicated for formula V, contain coupling components from the pyrimidone, pyrazolone, aminopyrazole or indole series.

B. Aminoazobenzene dyestuffs of the formula

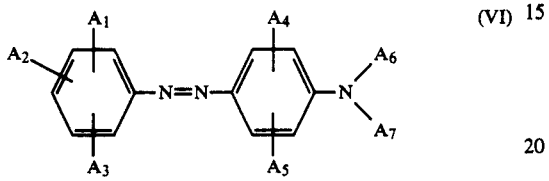
(VI)

in which $A_1$, $A_2$ and $A_3$ designate hydrogen, halogen such as Cl, Br or F, —CN, —$NO_2$, $C_1$-$C_6$-alkyl, in particular methyl and ethyl, cycloalkyl, in particular cyclopentyl and cyclohexyl, $C_1$-$C_6$-alkoxy, in particular methoxy and ethoxy, optionally substituted phenoxy, optionally substituted $C_1$-$C_{18}$-alkylsulphonyl, optionally substituted phenylsulphonyl, optionally substituted sulphamoyl, optionally substituted carbamoyl, optionally substituted phenylazo, $C_1$-$C_6$-alkoxycarbonyl, —$CF_3$, —SCN, $C_1$-$C_{12}$-alkylmercapto, $C_1$-$C_6$-alkylcarbonyl, optionally substituted phenylcarbonyl, or —OH, $A_4$ and $A_5$ designate hydrogen, halogen, such as Cl, Br or F, optionally substituted $C_1$-$C_6$-alkyl, in particular methyl and ethyl, optionally substituted $C_1$-$C_6$-alkoxy, in particular methoxy and ethoxy, optionally substituted —NH—CO—$C_1$-$C_6$-alkyl, in particular —NH—CO—$CH_3$ and —NH—CO—$C_2H_5$, or optionally substituted —NH—$SO_2$—$C_1$-$C_6$-alkyl, in particular —NH—$SO_2$—$CH_3$ and —NH—$SO_2$—$C_2H_5$, $A_6$ and $A_7$, independently of one another, designate hydrogen, optionally substituted $C_1$-$C_{12}$-alkyl or $C_3$-$C_{12}$-cycloalkyl, for example substituted with —OH, —$NH_2$ or —CN, or radicals of the formulae

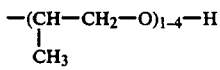

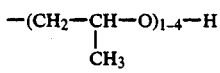

with the proviso that the dyestuff has at least one substituent which can react with an isocyanate. The following compounds of the formula VI are preferably used:

1. Compounds in which

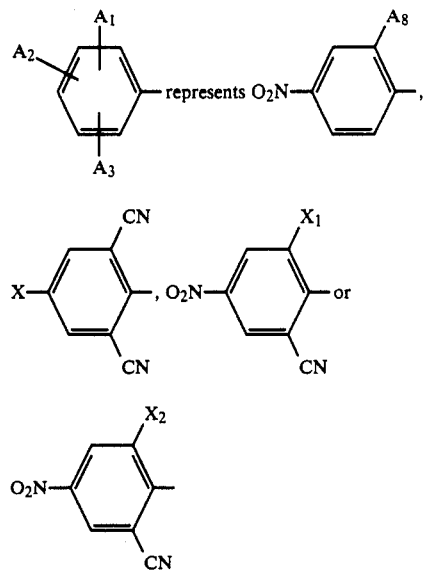

$A_8$ designating Cl, Br or CN,

X designating H, $CH_3$, $C_2H_5$, $C_6H_{12}$, tert.-butyl, $C_1$-$C_4$-alkoxy, Cl or Br, $X_1$ designating —$NO_2$, —CN, —$CF_3$ or $C_1$-$C_{12}$-alkylsulphonyl, and $X_2$ designating —$NO_2$ or —CN.

2. Compounds in which

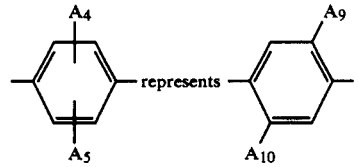

$A_9$ designating hydrogen, chlorine, $C_1$-$C_4$-alkyl, in particular methyl and ethyl, and $C_1$-$C_4$-alkoxy, in particular methoxy and ethoxy, and $A_{10}$ representing hydrogen, halogen such as Cl, Br or F, optionally substituted $C_1$-$C_6$-alkyl, in particular methyl and ethyl, optionally substituted alkoxy, in particular methoxy and ethoxy, optionally substituted —NH—CO—$C_1$-$C_6$-alkyl, in particular —NH—CO—$CH_3$ and —NH—CO—$C_2H_5$, and optionally substituted —NH—$SO_2$—$C_1$-$C_6$-alkyl, in particular —NH—$SO_2$—$CH_3$ and —NH—$SO_2$—$C_2H_5$.

It is equally possible to use dyestuffs of the formula

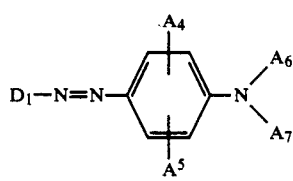
VII in which $D_1$ designates the radical of a diazo component from the thiophene, thiazole, thiadiazole, benzothiazole or benzisothiazole series.

C. Methine dyestuffs of the formula

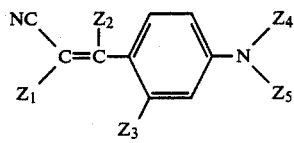

VIII in which
- $Z_1$ designates —CN, —COOCH$_3$, —COOC$_2$H$_5$, —COOC$_2$H$_4$OH, —SO$_2$CH$_3$, —SO$_2$C$_2$H$_5$ or —SO$_2$C$_2$H$_4$OH,
- $Z_2$ designates H or CN,
- $Z_3$ designates C$_1$–C$_6$-alkyl,
- $Z_4$ designates C$_1$–C$_6$-alkyl, hydroxy-C$_1$–C$_6$-alkyl, phenyl or benzyl, and
- $Z_5$ designates hydroxy-C$_1$–C$_6$-alkyl.

D. Copper phthalocyanine dyestuffs of the formula

CuPc(SO$_2$NX$_3$X$_4$)$_{1-6}$     IX in which
- $X_3$ designates hydrogen, C$_1$–C$_6$-alkyl, hydroxy-C$_1$–C$_6$-alkyl or amino-C$_1$–C$_6$-alkyl, and
- $X_4$ designates hydroxy-C$_1$–C$_6$-alkyl or amino-C$_1$–C$_6$-alkyl.

E. Rhodamine dyestuffs of the formula

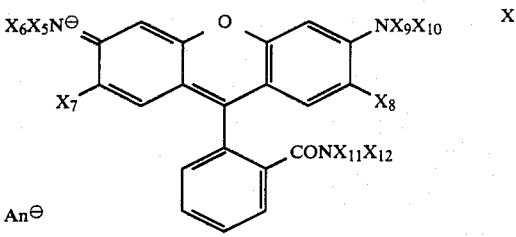

X in which
- $X_5$, $X_7$, $X_8$ and $X_9$ designate hydrogen, or C$_1$–C$_6$ alkyl which is optionally substituted by hydroxyl,
- $X_6$ and $X_{10}$ designate C$_1$–C$_6$-alkyl which is optionally substituted by hydroxyl,
- $X_{11}$ designates hydrogen, or C$_1$–C$_6$-alkyl which is optionally substituted by hydroxyl,
- $X_{12}$ designates hydroxy-C$_1$–C$_6$-alkyl, and
- An$^\ominus$ designates an anion.

Individual examples of dyestuffs of the formula F(Y'H)$_n$ are:

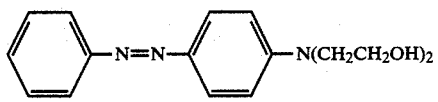

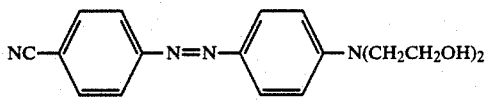

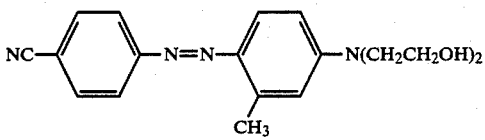

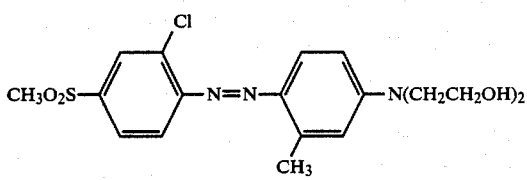

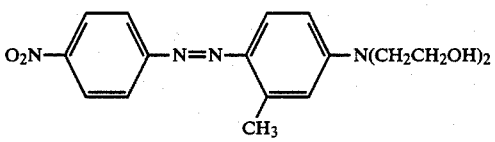

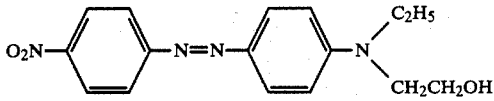

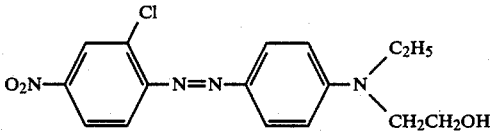

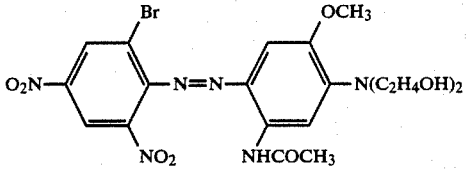

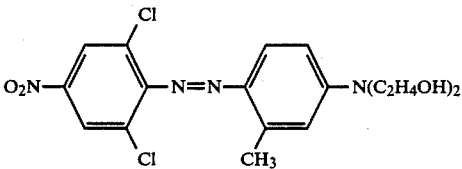

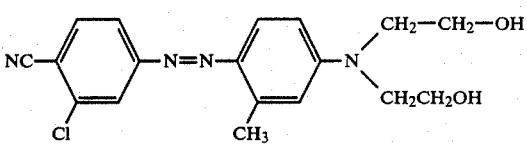

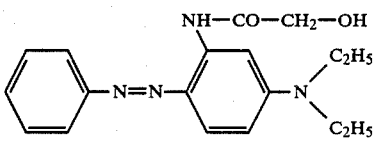

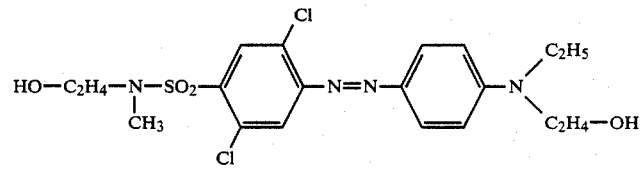

-continued
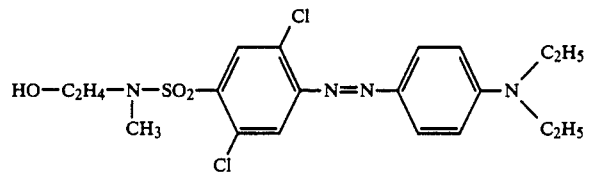
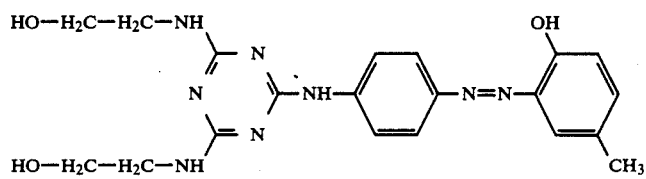
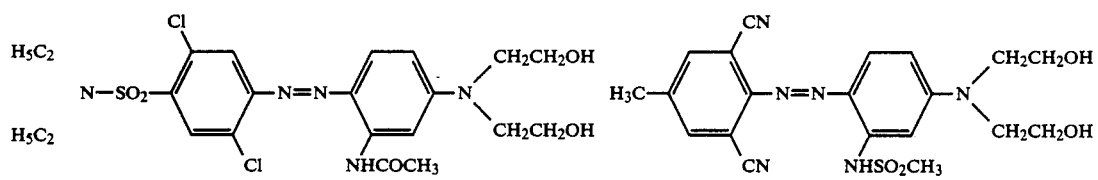
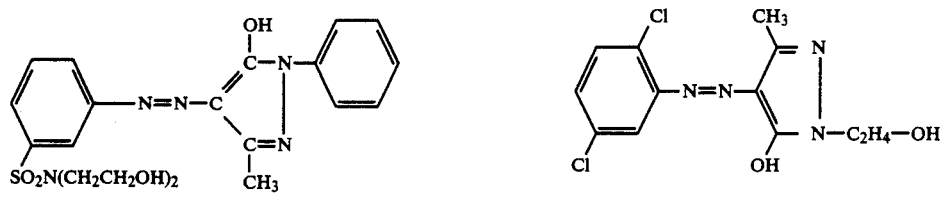
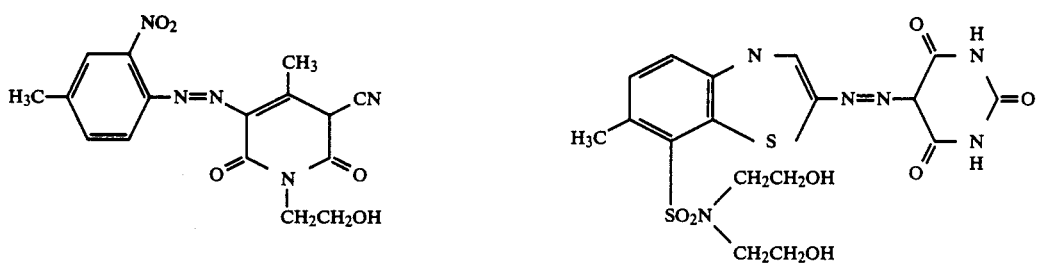
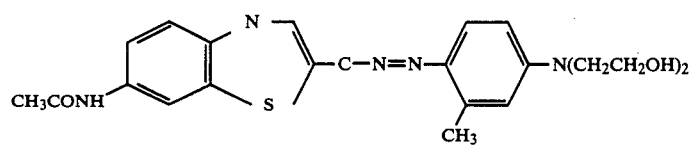
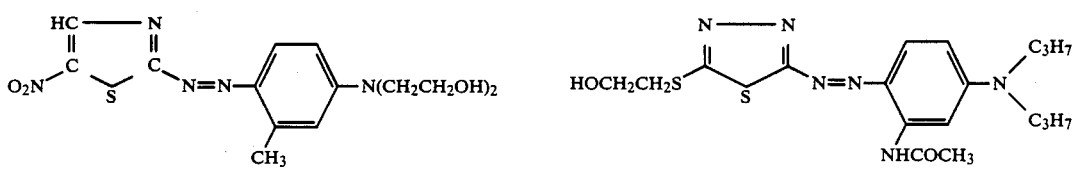

-continued
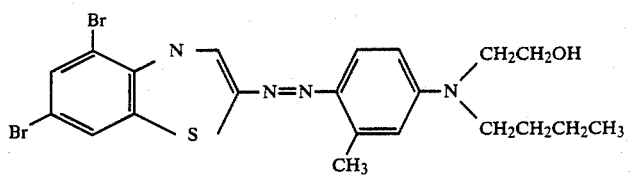
Complex chromium compound composed of 1 atom of Cr and 2 mol of the dyestuff of the formula
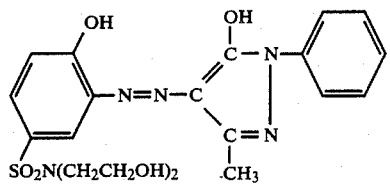
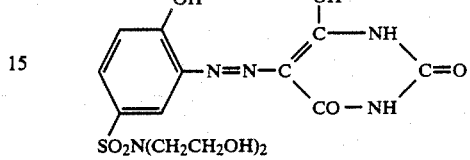
Complex chromium compound composed of 1 atom of Cr and 2 mol of the dyestuff of the formula
Complex chromium compound composed of 1 atom of Cr and 2 mol of the dyestuff of the formula
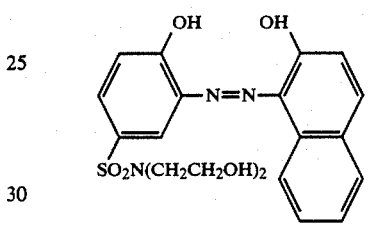
Complex cobalt compound composed of 1 atom of Co and 2 mol of the above mentioned dyestuff.
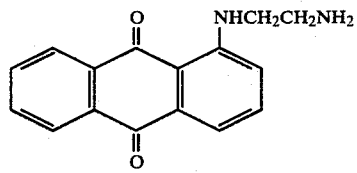
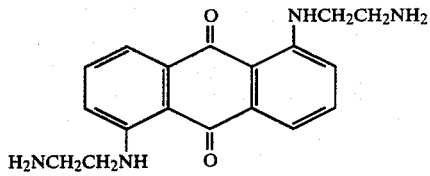
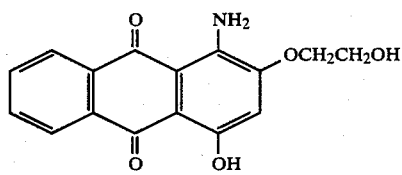
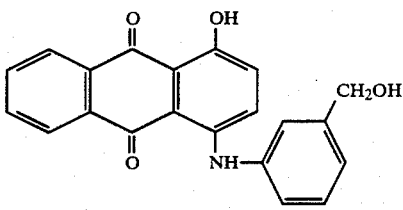
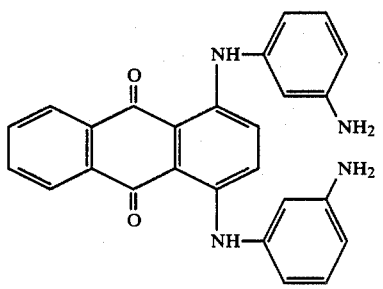
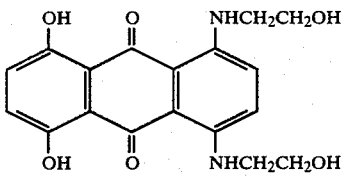

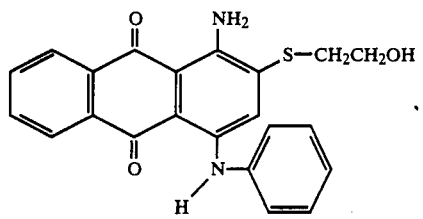
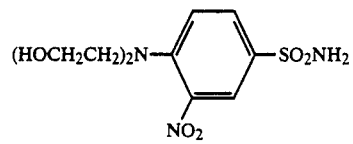
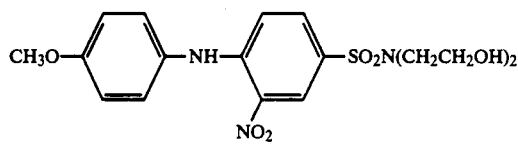
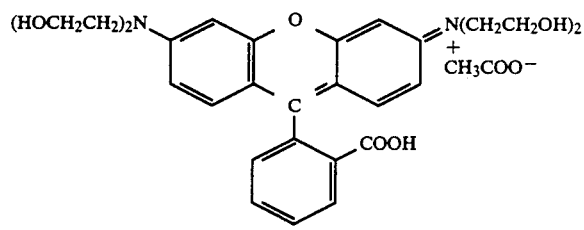
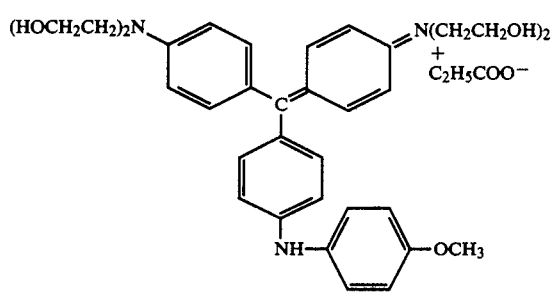
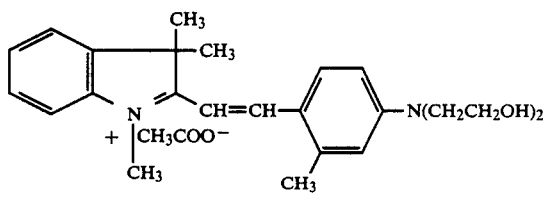
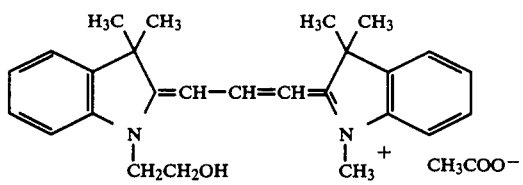
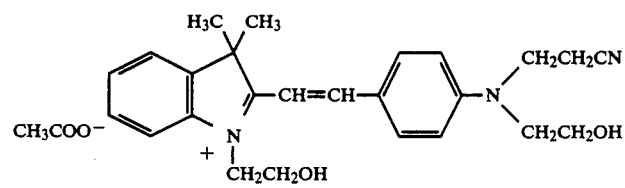
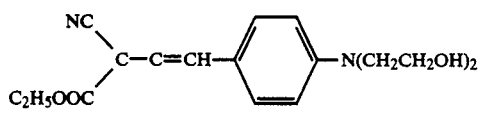
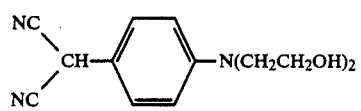
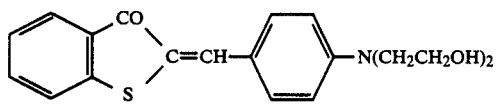
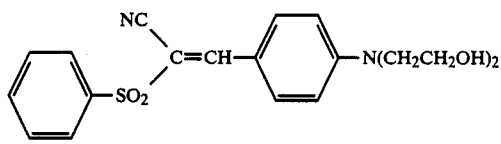
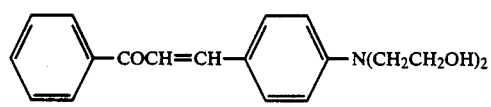
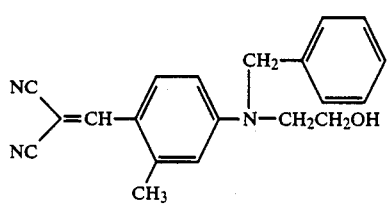

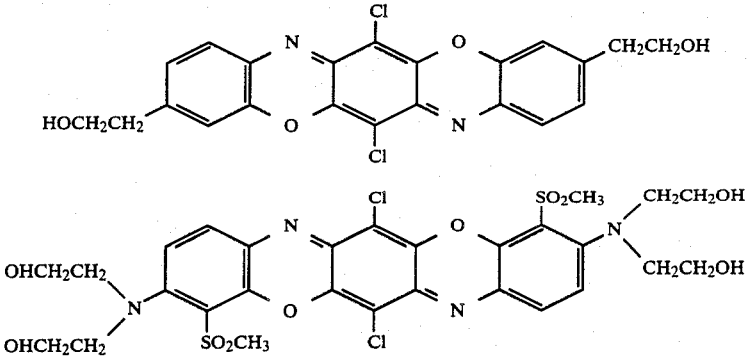

The examples which follow serve further to illustrate the invention but should not be understood to be restrictive. Parts are always parts by weight. (Examples 1–49: precursors; Examples 50–119: products according to the invention).

EXAMPLES 1 AND 2

Preparation of a NCO-functional resin

EXAMPLE 1

Preparation of a trimethylolpropane ester of linseed oil fatty acid 1,946 parts of linseed oil fatty acid and 469 parts of trimethylolpropane are heated, while passing nitrogen through, to 140° C. in 1 h and then to 220° C. in 8 h, the water of reaction being distilled via a distillation apparatus under a reflux condenser into a receiver. The acid number after 3 h at 220° C. was 4.2.

EXAMPLE 2

Preparation of the NCO-functional resin 186.9 parts of the resin from Example 1 and 52.5 parts of toluylene diisocyanate (technical mixture with about 80% by weight of the 2,4-isomer in addition to about 20% by weight of 2,6-diiocyanatotoluene) are reacted together under $N_2$ at 80° C. for 1 h. The content of free isocyanate is then 5.28% by weight (theory: 5.27% by weight).

EXAMPLES 3–21 AND 22–49

Preparation of NCO-functional resins corresponding to (2)

EXAMPLES 3–21

Hydroxy-functional precursors

In analogy to Example 1, OH-functional precursors for the NCO-functional resins are prepared from carboxylic acids and polyalcohols, see Table 1 (abbreviations:
TMP=trimethylolpropane, penta=pentaerythritol, NPG=neopentylglycol, and adipol=1,6-hexane diol).

TABLE 1

| Example | Carboxylic acid | Parts by Weight | Polyalcohol | Parts by Weight | Measured OH Number | Measured Acid Number |
|---|---|---|---|---|---|---|
| 3 | Soya oil fatty acid | 560 | TMP | 134 | 72 | 4 |
| 4 | Soya oil fatty acid | 1400 | Penta | 227 | 56 | 4 |
| 5 | Linseed oil fatty acid | 1390 | Penta | 227 | 64 | 4 |
| 6 | Linseed oil fatty acid Benzoic acid | 1112 244 | Penta | 272 | 81 | 3 |
| 7 | Linseed oil fatty acid 4-tert.-butylbenzoic acid | 1112 328 | Penta | 272 | 82 | 4 |
| 8 | Linseed oil fatty acid abietic acid | 278 160 | Penta | 68 | 54 | 4 |
| 9 | Linseed oil fatty acid Adipic Acid | 1043 110 | Penta | 204 | 40 | 5 |
| 10 | Linseed oil fatty acid | 1112 | Adipol | 472 | 154 | 2 |
| 11 | Linseed oil fatty acid | 556 | NPG | 208 | 134 | 1 |
| 12 | Linseed oil fatty acid | 1390 | Penta | 340 | 142 | 4 |
| 13 | Hydrogenated abietic acid | 726 | TMP | 134 | 48 | 6 |
| 14 | Conjuvandol fatty acid | 1390 | TMP | 335 | 87 | 4 |
| 15 | Hydr. abietic acid Linseed oil fatty acid | 362 278 | TMP | 134 | 62 | 4 |
| 16 | Hydr. abietic acid Linseed oil fatty acid | 724 278 | Penta | 136 | 35 | 5 |
| 17 | Hydr. abietic acid Linseed oil fatty acid | 362 556 | Penta | 136 | 40 | 4 |
| 18 | Stearic acid Benzoic acid | 569 488 | Penta | 272 | 96 | 3 |
| 19 | Stearic acid | 1280 | Penta | 204 | 56 | 4 |
| 20 | Soya oil fatty acid | 560 | TMP | 268 | 371 | 4 |
| 21 | Linseed oil fatty acid Benzoic acid | 834 366 | Penta | 272 | 89 | 4 |

EXAMPLES 22–49

Preparation of NCO-functional resins corresponding to (2) from the precursors 3–21

In analogy to Example 2, NCO-functional resins are prepared from the precursors 3–21 with isocyanates, see Table 2 (abbreviations in the following tables:
IPDI=isophorone diisocyanate, HDI=hexamethylene diisocyanate, TDI 100=2,4-diisocyanatotoluene, TDI 80=toluylene diisocyanate isomer mixture with about 80% of 2,4-diisocyanatotoluene and about 20% of 2,6-diisocyanatotoluene).

TABLE 2

| NCO-func.product Example | OH-precursor from Example | Parts by weight | Diisocyanate | Parts by Weight |
|---|---|---|---|---|
| 22 | 3 | 131.6 | IPDI | 44.4 |
| 23 | 4 | 184.4 | IPDI | 44.4 |
| 24 | 5 | 181.2 | IPDI | 44.4 |
| 25 | 6 | 304 | TDI 80 | 69.6 |
| 26 | 7 | 320.8 | TDI 80 | 69.6 |
| 27 | 8 | 189.6 | TDI 80 | 33.1 |
| 28 | 9 | 255 | HDI | 25.2 |
| 29 | 10 | 264.6 | HDI | 117.6 |
| 30 | 11 | 182 | TDI 80 | 87 |
| 31 | 12 | 147.6 | TDI 80 | 69.6 |
| 32 | 13 | 46.7 | TDI 80 | 7.0 |
| 33 | 14 | 98.1 | TDI 80 | 26.1 |
| 34 | 15 | 127.5 | TDI 80 | 26.1 |
| 35 | 16 | 143.5 | TDI 80 | 17.4 |
| 36 | 17 | 190 | TDI 80 | 26.1 |
| 37 | 18 | 122.1 | TDI 80 | 34.8 |
| 38 | 19 | 280.7 | TDI 80 | 52.2 |
| 39 | 20 | 69.2 | IPDI | 88.8 |

Furthermore, the following NCO-functional resins 40–49 are prepared from the precursors of Table 1 in analogous manner (see Example 2) with diisocyanates changed compared with Table 2 (Table 3).

TABLE 3

| NCO-funct. product Example | OH precursor from Example | Parts by weight | Diisocyanate | Parts by Weight |
|---|---|---|---|---|
| 40 | 3 | 131.6 | HDI | 33.6 |
| 41 | 4 | 276.6 | HDI | 50.4 |
| 42 | 5 | 181.2 | HDI | 33.6 |
| 43 | 5 | 137.1 | TDI 80 | 26.1 |
| 44 | 1 | 91.6 | TDI 100 | 17.4 |
| 45 | 1 | 130.8 | IPDI | 44.4 |
| 46 | 1 | 128.8 | HDI | 33.6 |
| 47 | 21 | 272.8 | TDI 80 | 69.6 |
| 48 | 9 | 182.3 | IPDI | 28.9 |
| 49 | 1 | 196.2 | TDI 100 | 52.2 |

EXAMPLE 50

306.3 g of the precursor from Example 2 and 96.96 g of a yellow methine dyestuff of the following structure (1)

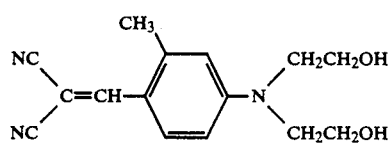

(1)

are reacted together in 3,000 ml of dry cyclohexanone at 80° C. for 12 h; undissolved portions of the dyestuff (1) dissolve during the course of the reaction. Subsequently, cyclohexanone is removed by distillation at 15 Torr, finally at about 1 Torr/120° C. internal temperature. The product is a glass-like solid mass which is very slightly sticky and is miscible with commercially available varnishes and mineral oils for sheet-fed and rotary letterpress and offset printing.

A formulation of the following composition, for example, can be used for testing and printing:

| | |
|---|---|
| 56 parts by weight | of a 50% strength solution of a commercially available rotary offset varnish based on a long-oil linseed oil alkyd resin and a resin ester, as described in the Lackrohstoff-Tabellen (Tables of Raw Materials for Surface Coatings) by Karsten, 7th edition, 1981, |
| 23 parts by weight | of a pigment, for example according to Example 50, |
| 21 parts by weight | of a mineral oil of limited aromatic content and narrow boiling range, for example 210/230° C. or 230/260° C.. |
| 100 parts by weight | |

In the same manner as in Example 50, dyestuffs (1)–(24) are reacted with precursors 2 and 22 to 49 (variant I). If the batch sizes are changed, the amount of cyclohexanone is corrected correspondingly. In addition, two process variants are indicated, in which a commercially available offset printing varnish (stated amount: varnish based on the total solids content) is admixed before removal of the cyclohexanone by distillation, specifically in variant II a varnish based on a urethane-alkyd (Desmalkyd ® L 181) and in variant III a resin based on a long-oil linseed oil alkyd resin combined with a resin ester and/or a phenol resin modified with colophony.

The products are then obtained as highly viscous pastes or glass-like masses which can be mixed with (other) commercially available offset printing ink vehicles.
EXAMPLES 51–119
In Examples 51–119, the following dyestuffs (2) to (24) are additionally used:
(2) (yellow)
(3) (red)
(4) (red)
(5) (red)
(6) (red)
(7) (red)
(8) (red)

-continued
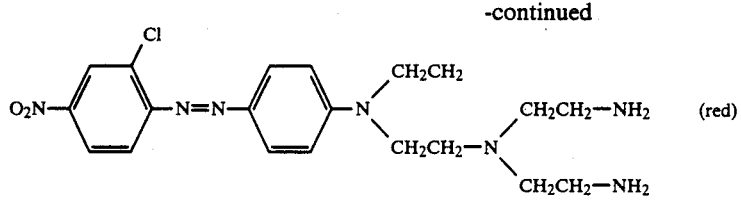 (9) (red)
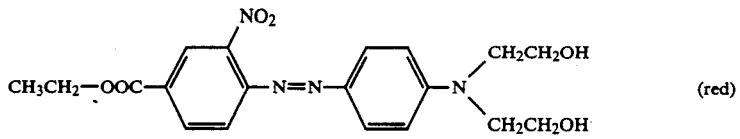 (10) (red)
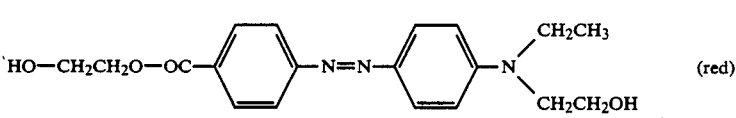 (11) (red)
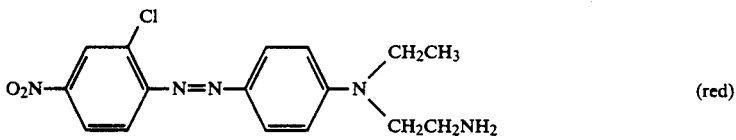 (12) (red)
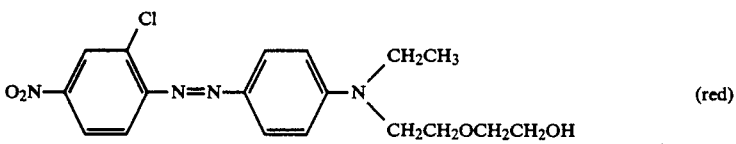 (13) (red)
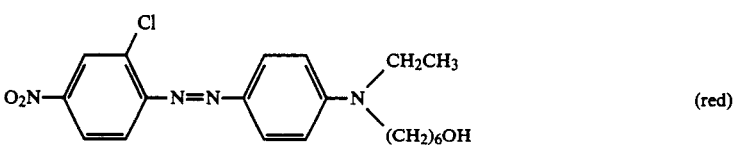 (14) (red)
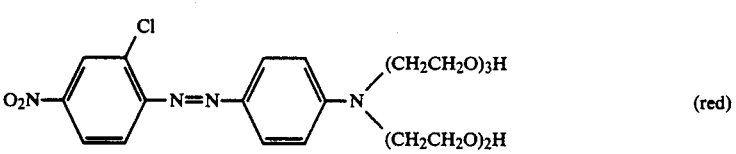 (15) (red)
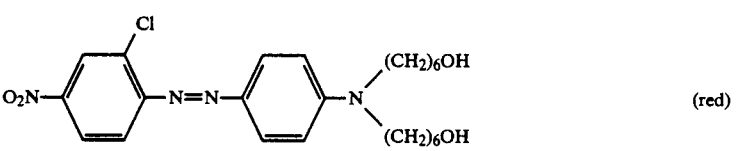 (16) (red)
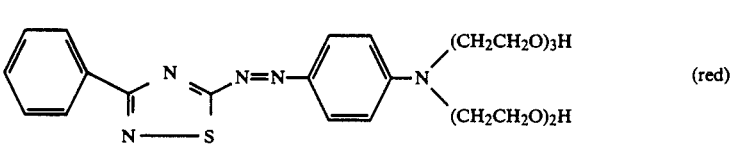 (17) (red)
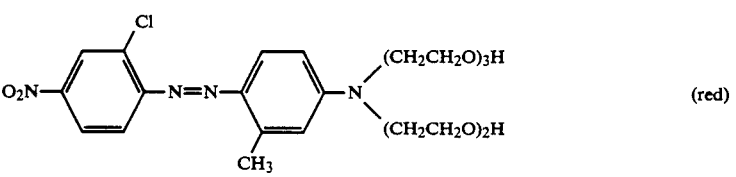 (18) (red)
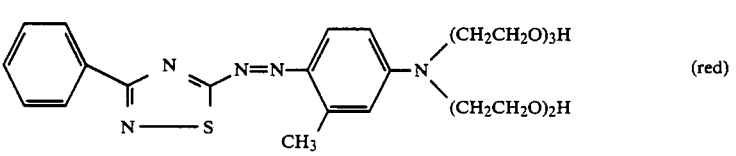 (19) (red)

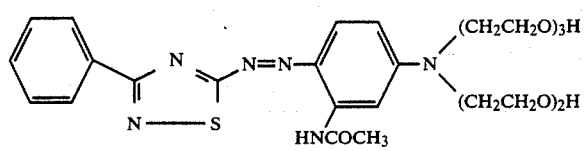
(20) (red)
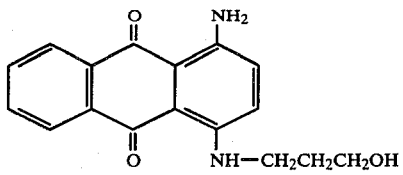
(21) (blue)
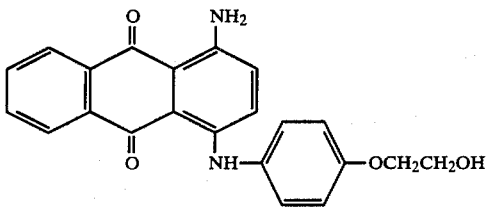
(22) (blue)
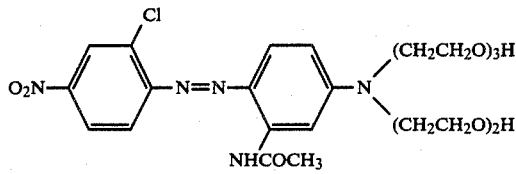
(23) (red)
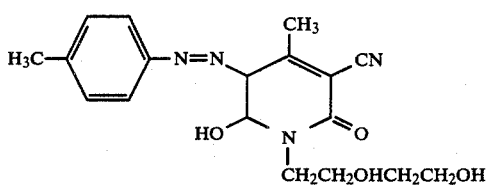
(24) (yellow)
TABLE 4
| Example | Dyestuff | Parts by weight of dyestuff | Precursor NCO-functional from Example | Parts by Weight of precursor | Parts by weight of unreacted dyestuff removed by filtration | Variant | % by weight of Varnish |
|---|---|---|---|---|---|---|---|
| 51 | (1) | 8.3 | 2 | 24.8 | — | II | 25 |
| 52 | (1) | 8.3 | 34 | 24.8 | Trace | I | — |
| 53 | (1) | 6.9 | 35 | 29.1 | 0.34 | II | 25 |
| 54 | (1) | 6.9 | 36 | 32.8 | Trace | I | — |
| 55 | (2) | 5.5 | 22 | 17.6 | 0.62 | II | 80 |
| 56 | (2) | 8.3 | 22 | 13.2 | Trace | II | 75 |
| 57 | (2) | 5.5 | 23 | 22.9 | — | II | 50 |
| 58 | (2) | 5.5 | 24 | 22.8 | — | II | 50 |
| 59 | (2) | 11.0 | 24 | 22.6 | — | II | 67 |
| 60 | (2) | 41.3 | 25 | 165.0 | — | III | 25 |
| 61 | (2) | 77.3 | 26 | 232.0 | — | III | 25 |
| 62 | (2) | 41.3 | 27 | 175.8 | — | III | 25 |
| 63 | (2) | 27.5 | 37 | 89.7 | — | I | — |
| 64 | (2) | 22.0 | 38 | 98.9 | — | I | — |
| 65 | (2) | 38.5 | 38 | 86.6 | 2.0 | I | — |
| 66 | (2) | 11.0 | 39 | 15.8 | Trace | II | 50 |
| 67 | (2) | 5.5 | 40 | 16.5 | — | II | 50 |
| 68 | (2) | 66.0 | 41 | 261.6 | — | II | 50 |
| 69 | (2) | 11.0 | 41 | 21.8 | Trace | II | 67 |
| 70 | (2) | 5.5 | 42 | 21.5 | — | II | 50 |
| 71 | (2) | 41.3 | 43 | 190.9 | — | III | 25 |
| 72 | (2) | 5.5 | 45 | 17.5 | 0.03 | II | 50 |
| 73 | (2) | 5.5 | 46 | 16.2 | — | II | 50 |
| 74 | (2) | 27.5 | 46 | 81.2 | — | III | 25 |
| 75 | (2) | 41.3 | 47 | 143.3 | — | III | 25 |
| 76 | (3) | 39.8 | 23 | 183.0 | 12.6 | II | 50 |
| 77 | (3) | 69.6 | 23 | 160.2 | 2.65 | III | 25 |

TABLE 4-continued

| Example | Dyestuff | Parts by weight of dyestuff | Precursor NCO-functional from Example | Parts by Weight of precursor | Parts by weight of unreacted dyestuff removed by filtration | Variant | % by weight of Varnish |
|---|---|---|---|---|---|---|---|
| 78 | (3) | 29.8 | 27 | 114.6 | 3.75 | III | 25 |
| 79 | (3) | 49.7 | 31 | 54.3 | 6.8 | III | 25 |
|   |   |   | 43 | 121.7 |   |   |   |
| 80 | (3) | 37.3 | 43 | 176.0 | 0.39 | III | — |
| 81 | (4) | 14.1 | 22 | 35.2 | — | II | 50 |
| 82 | (5) | 15.3 | 2 | 38.7 | — | II | 25 |
| 83 | (5) | 26.8 | 2 | 139.6 | 1.7 | II | 25 |
| 84 | (5) | 34.5 | 43 | 114.5 | 0.23 | II | 25 |
| 85 | (5) | 7.7 | 44 | 49.9 | Trace | II | 25 |
| 86 | (5) | 7.7 | 44 | 49.4 | Trace | III | 25 |
| 87 | (5) | 11.5 | 49 | 53.6 | Trace | III | 25 |
| 88 | (6) | 15.2 | 28 | 141.7 |   | III | 25 |
| 89 | (6) | 20.2 | 48 | 142.1 | Trace | I | — |
| 90 | (7) | 10.5 | 2 | 29.3 | 0.08 | II | 25 |
| 91 | (7) | 7.0 | 25 | 21.0 | Trace | II | 25 |
| 92 | (7) | 27.9 | 29 | 43.7 | — | III | 50 |
| 93 | (7) | 17.4 | 31 | 60.9 | — | II | 25 |
| 94 | (7) | 7.0 | 31 | 24.3 | Trace | II | 25 |
|   |   |   | 43 | 28.1 |   |   |   |
| 95 | (7) | 8.7 | 32 | 37.5 | — | I | — |
| 96 | (7) | 34.9 | 43 | 111.1 | — | II | 25 |
| 97 | (7) | 7.0 | 44 | 26.0 | 0.11 | II | 25 |
| 98 | (8) | 7.0 | 43 | 22.2 | 1.78 | II | 25 |
| 99 | (9) | 8.7 | 2 | 37.3 | 0.16 | II | 25 |
| 100 | (10) | 6.0 | 2 | 26.0 | — | II | 25 |
| 101 | (10) | 10.1 | 30 | 26.9 | — | I | — |
| 102 | (11) | 6.0 | 2 | 26.0 | — | II | 25 |
| 103 | (12) | 10.4 | 2 | 26.0 | — | II | 25 |
| 104 | (13) | 9.8 | 2 | 21.6 | — | II | 25 |
| 105 | (14) | 10.1 | 2 | 21.0 | — | II | 25 |
| 106 | (15) | 9.9 | 2 | 35.7 | — | II | 25 |
| 107 | (15) | 12.4 | 2 | 22.3 | — | II | 25 |
| 108 | (16) | 4.8 | 22 | 16.6 | — | II | 25 |
| 109 | (16) | 4.8 | 2 | 8.3 | — | II | 25 |
| 110 | (17) | 8.0 | 2 | 27.4 | — | II | 25 |
| 111 | (18) | 7.7 | 2 | 27.4 | — | II | 25 |
| 112 | (19) | 8.4 | 2 | 27.4 | — | II | 25 |
| 113 | (20) | 8.4 | 2 | 24.8 | — | II | 25 |
| 114 | (20) | 8.4 | 33 | 24.8 | — | II | 25 |
| 115 | (21) | 8.9 | 2 | 24.8 | — | II | 25 |
| 116 | (22) | 11.2 | 2 | 24.8 | 3.8 | II | 25 |
| 117 | (23) | 11.6 | 2 | 33.5 | 0.2 | I | — |
| 118 | (1) | 48.8 | 2 | 302.4 | — | I | — |
| 119 | (24) | 124.7 | 2 | 298.3 | — | I | — |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A printing ink, characterized in that the colouring agent comprises at least one modified dyestuff which has been prepared by reaction of 3-70% by weight of a dyestuff of the formula $$M(Y'H)_n \qquad \qquad I$$

in which
M designates a dyestuff radical,
Y' designates —O—, —S—,

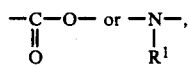

$R^1$ designates hydrogen, alkyl or cycloalkyl, and
n designates 1, 2, 3, 4, 5 or 6, with 97-30% by weight of a NCO-functional compound.

2. Printing ink according to claim 1, characterized in that the colouring agent comprises at least one modified dyestuff which has a structural element of the formula

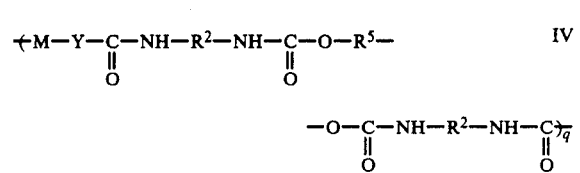

in which
$R^5$ designates

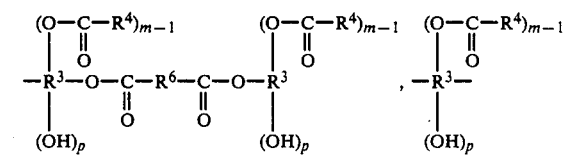

or

-continued

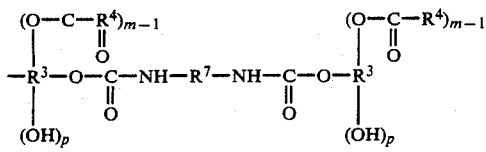

R⁶ and R⁷ designate organic radicals, and
q designates 2, 3, 4, 5, 6, 7, 8, 9 or 10 and
R², R³, R⁴, m and p have the meanings given in claim 32.

3. Printing ink according to claim 1, characterized in that the modified dyestuff has been prepared by reaction of 3–55% by weight of a dyestuff of the formula M(Y'H)$_n$ with 97–45% by weight of a NCO-functional compound.

4. Printing ink according to claim 1, containing a pigment.

5. A colouring agent suitable for use in printing ink comprising the reaction product of
(a) between about 3 and 70 weight percent of a dyestuff of the formula $$M(Y'H)_n \qquad \text{I}$$

in which
M designates a dyestuff radical,
Y' designates —O—, —S—,

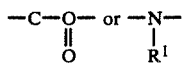

R¹ designates hydrogen, alkyl or cycloalkyl and
n designates an integer between 1 and 6 inclusive, and (b) between about 97 and 30 weight percent of a free NCO group bearing resin which is itself the reaction product of
(i) between about 8 and 35 weight percent of one or more polyalcohols bearing between 2 and 6 hydroxyl groups,
(ii) between about 15 and 80 weight percent of one or more monocarboxylic acids,
(iii) between about 0 and 50 weight percent of one or more dicarboxylic acids,
(iv) between about 0 and 50 weight percent of aliphatic, cycloaliphatic or aromatic diisocyanates whose isocyanate groups are fully reacted in the formation of said resin, and
(v) between about 9 and 75 weight percent of aliphatic, cycloaliphatic or aromatic diisocyanates who, on average, retain one unreacted isocyanate group after formation of said resin.

6. The colouring agent of claim 5 wherein the dyestuff is selected from the group consisting of anthraquinone dyestuffs, pyridone-azo dyestuffs, amino azobenzene dyestuffs, methine dyestuffs, copper phthalocyanine dyestuffs and rhodamine dyestuffs.

7. The colouring agent of claim 5 wherein the dyestuff is selected from the group of dyestuff classes consisting of triphenyl methane, oxazine, dioxazine, thiazine, nitro, anthraquinone, coumarin, quinophthalone, benzodifuranone, perylene, naphthalimide, azo, phthalocyanine, and methine.

8. The colouring agent of claim 7 wherein (a) the diisocyanates are of the formula R²(NCO)₂ and R² represents alkylene, cycloalkylene or arylene radicals,
(b) the polyalcohols are of the formula R³(OH)$_x$, R³ is an aliphatic radical and x is an integer between 2 and 6 inclusive,
(c) the monocarboxylic acids are of the formula R⁴COOH and R⁴ is an aliphatic or aromatic hydrocarbon radical of between 4 and 23 carbon atoms which may be substituted by hydroxyl, halogen or oxygen, and
(d) the dicarboxylic acids are of the formula R⁶(COOH)₂ and R⁶ is an aliphatic or aromatic hydrocarbon radical of between 1 and 16 carbon atoms which may be substituted by hydroxyl, halogen or oxygen.

9. The colouring agent of claim 8 wherein the polyalcohols and carboxylic acids are reacted such that all the carboxylic acid groups are consumed before reaction with the diisocyanates to form the free NCO group bearing resin.

10. The colouring agent of claim 9 wherein the NCO to OH ratio is between about 2:1 and 1.1:1.

11. A printing ink containing a colouring agent, optionally a varnish and, optionally, one or more additives such as siccatives, anti-skinning agents and flow-control agents, characterized in that the colouring agent comprises at least one modified dyestuff of the formula $$M(\!-\!Y\!-\!\overset{\underset{\|}{O}}{C}\!-\!NHR)_n \qquad \text{II}$$

in which
M designates a dyestuff radical,
Y designates a direct bond or the radical of a group —Y—H which can be added onto the NCO group,
R designates an organic radical, the total number of C atoms in the n R radicals being ≧18, and
n designates 1, 2, 3, 4, 5 or 6, it being possible where n≧2 for the radicals

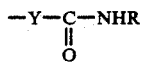

to be identical or different

12. Printing ink according to claim 11, containing a varnish.

13. Letterpress or offset printing ink according to claim 12.

14. Printing ink according to claim 11 or 12 or 13, characterized in that M represents the radical of a dyestuff selected from the group consisting of the triphenylmethane, oxazine, dioxazine, thiazine, nitro, anthraquinone, coumarin, quinophthalone, benzodifuranone, perylene, naphthalimide, azo (monoazo), phthalocyanine and methine series.

15. Printing ink according to claim 14, containing a dyestuff of the formula I in which Y represents —O—, —S— or

R¹ denoting H, alkyl or cycloalkyl.

16. Printing ink according to claim 15, characterized in that the colouring agent comprises at least one modified dyestuff of the formula
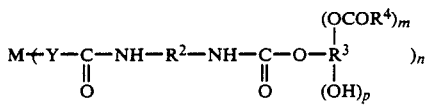
in which
R² and R⁴ designate organic radicals,
R³ designates an aliphatic radical,
m designates 1, 2, 3, 4 or 5, and
p designates 0, 1, 2, 3 or 4.
* * * * *